United States Patent [19]

Abtahi

[11] Patent Number: 5,436,443
[45] Date of Patent: Jul. 25, 1995

[54] POLARADIOMETRIC PYROMETER IN WHICH THE PARALLEL AND PERPENDICULAR COMPONENTS OF RADIATION REFLECTED FROM AN UNPOLARIZED LIGHT SOURCE ARE EQUALIZED WITH THE THERMAL RADIATION EMITTED FROM A MEASURED OBJECT TO DETERMINE ITS TRUE TEMPERATURE

[75] Inventor: Ali A. Abtahi, Canyon Country, Calif.

[73] Assignee: The United States of America as represented by the Administrator of the National Aeronautics and Space Administration, Washington, D.C.

[21] Appl. No.: 273,542

[22] Filed: Jul. 6, 1994

[51] Int. Cl.$^6$ ............................ G02F 1/01; H01J 40/14
[52] U.S. Cl. ............................... 250/225; 374/126; 356/43
[58] Field of Search .................. 250/225, 341.8, 341.1, 250/338.3; 356/369, 43; 374/120, 121, 129, 126, 128, 130, 161

[56] References Cited

U.S. PATENT DOCUMENTS

| | | | |
|---|---|---|---|
| 2,837,917 | 6/1958 | Machler | 374/126 |
| 3,422,678 | 1/1969 | Murray | 73/355 |
| 3,433,052 | 3/1969 | Maley | 73/15 |
| 3,462,224 | 8/1969 | Woods et al. | 356/47 |
| 3,492,869 | 2/1970 | Toyota et al. | 73/355 |
| 4,020,695 | 5/1977 | Roney | 73/355 EM |
| 4,111,050 | 9/1978 | Waddoups | 73/362 R |
| 4,375,333 | 3/1983 | Clark et al. | 356/47 |
| 4,498,765 | 2/1985 | Herve | 356/43 |
| 4,628,196 | 12/1986 | Twerdochlib | 250/225 |
| 4,707,147 | 11/1987 | Aoki et al. | 374/161 |
| 4,804,264 | 2/1989 | Kirchhofer et al. | 356/44 |
| 4,883,364 | 11/1989 | Astheimer | 374/129 |
| 5,011,295 | 4/1991 | Krishna et al. | 374/126 |
| 5,271,084 | 12/1993 | Vandenabeele et al. | 392/416 |
| 5,350,236 | 9/1994 | Thakur et al. | 374/161 |

Primary Examiner—David C. Nelms
Assistant Examiner—Stephen Calogero
Attorney, Agent, or Firm—John H. Kusmiss; Thomas H. Jones; Guy M. Miller

[57] ABSTRACT

A radiation pyrometer for measuring the true temperature of a body is provided by detecting and measuring thermal radiation from the body based on the principle that the effects of angular emission $I_1$ and reflection $I_2$ on the polarization states p and s of radiation are complementary such that upon detecting the combined partial polarization state components $$I_p = I_{1p} + I_{2p}$$

$$I_s = I_{1s} + I_{2s}$$

and adjusting the intensity of the variable radiation source of the reflected radiation $I_2$ until the combined partial radiation components $I_p$ and $I_s$ are equal, the effects of emissivity as well as diffusivity of the surface of the body are eliminated, thus obviating the need for any post processing of brightness temperature data.

6 Claims, 2 Drawing Sheets

POLARADIOMETRIC PYROMETER IN WHICH THE PARALLEL AND PERPENDICULAR COMPONENTS OF RADIATION REFLECTED FROM AN UNPOLARIZED LIGHT SOURCE ARE EQUALIZED WITH THE THERMAL RADIATION EMITTED FROM A MEASURED OBJECT TO DETERMINE ITS TRUE TEMPERATURE

ORIGIN OF INVENTION

The invention described herein was made in the performance of work under a NASA contract, and is subject to the provisions of Public Law 96-517 (35 USC 202) in which the contractor has elected not to retain title.

TECHNICAL FIELD

The invention relates to a radiation pyrometer for measuring the true temperature of a body by detecting and measuring thermal radiation from the body, and more particularly to a polaradiometric pyrometer based on the principle that the effects of angular emission and reflection on the polarization state of radiation are complementary.

BACKGROUND ART

In a conventional radiation pyrometer, part of the thermal radiation emitted by a hot body is focused onto a thermopile where the resultant heating of the thermopile causes an electrical signal to be generated in proportion to the thermal radiation. The signal thus generated may then be calibrated for display and recording of temperature. The problem is that thermal radiation from the body depends not only on its surface temperature but also its surface characteristics.

Pyrometers are classified generally into two types. One type referred to as a total-radiation pyrometer requires that the field of view be filled and the other type does not. In the one type, a comparison is made between the radiation of the body whose temperature is to be measured and the radiation of a reference body. For an example of that one type, known as an optical pyrometer, an image of the body is focused in the plane of a filament that is heated by current the amplitude of which is controlled by a calibrated rheostat. The filament can be readily viewed in that plane until the controlled current heats the filament to a temperature at which its radiation blends into the image of the body. Temperature of the body is then read from the calibrated rheostat. However, the accuracy of such an optical pyrometer will still depend upon its surface emissivity.

One approach for the implementation of an optical pyrometer of the second type, which does not require the field of view to be filled, is to make measurements of the radiation emitted by the body in two wavelength (color) regions. A calibrated ratio of the two measurements is then accepted as the true temperature of the body. The assumption is that the effect of surface characteristics cancels out in the ratio measurement sufficiently to provide a measurement close to the true temperature.

Yet another approach for implementation of a pyrometer of the second type assumes that thermal radiation from a black body falls on a sample body whose temperature is to be measured at a convenient angle of incidence and that a radiation detector measures total reflected and emitted radiation. The true temperature of the sample body is then determined from the calibrated measurement of radiation provided the black body and the sample body are maintained at the same temperature. In that special case, the total thermal radiation (emitted and reflected) detected from the sample body is the same as if the radiation detector received emitted radiation from only the black body which is at the same temperature as the sample body. However, that assumption is believed to be erroneous because of random scattering of radiation from the black body by the sample body due to its surface characteristics. See the background discussion of U.S. Pat. No. 3,442,673 titled *APPARATUS AND METHOD FOR MEASURING TEMPERATURES* by Thomas P. Murray.

To overcome that erroneous assumption, Murray discloses a system which uses a rotating polarization analyzer 52 which generates from the combined reflected and emitted radiation a cyclical resultant beam. Then successive measurements of the cyclical resultant beam are made while the black body temperature is varied until a null measurement is reached. That null identifies when the black body temperature equals the sample body temperature. While this use of a rotating polarization analyzer overcomes what is believed to be an erroneous assumption, the apparatus is complex and cumbersome to use not only because of using a rotating polarization analyzer but also because of using a controlled black body reference.

An alternative approach for the implementation of an optical pyrometer of the second type is disclosed in U.S. Pat. No. 3,462,224 titled *POLARIZATION PYROMETER* by W. W. Woods et al. There a laser 11 replaces the black body source of radiation incident at a convenient angle. Reflected radiation from the laser is first measured together with thermal radiation from the reflecting surface through a polarization state analyzer (PSA) alternately set for measuring the component of polarization p in the plane of incident radiation from the laser and the polarization component s perpendicular to that plane. The difference between measured p and s radiation is taken by a difference amplifier 26 and used to adjust the laser intensity until that difference is nulled. After that laser intensity adjustment, the radiation emanating from test surface 10 corresponds to that of a black body at the unknown temperature of the test body. Then the p and s components of reflected radiation from a standard lamp 20 are similarly measured using a chopper 19 to switch the polarizer and detector from the reflected laser radiation to a standard lamp and a difference amplifier 30 is used to measure the difference between the p and s components of light reflected this time by a member 19a of the chopper 19. That second measured difference is used to adjust the intensity of the standard lamp until the second measured difference is nulled. The radiation from the lamp is then assumed to also correspond to radiation from a black body at the temperature of the test surface (Col. 4, lines 176 to 26). By alternately switching the chopper 19 between laser light reflected by the test surface and reference light reflected by the chopper member 19a and automatically adjusting the laser and reference light to bring the system to a stable condition, the energization of the standard lamp 20 is assumed to be proportional to the temperature of the test surface 10. That assumption is believed to be inaccurate.

Another example of an optical pyrometer which determines the temperature of a body from its thermal radiation and seeks to overcome the effects of surface characteristics of the body is disclosed in U.S. Pat. No. 5,011,295 titled METHOD AND APPARATUS TO SIMULTANEOUSLY MEASURE EMISSIVITY AND THERMODYNAMIC TEMPERATURE OF REMOTE OBJECTS by S. Krishnan et al. That system is even more complex than the two discussed above. It seeks to separately determine emissivity, reflectivity and optical constants as well as the apparent brightness temperature of the sample with a single instrument in order to correct the brightness temperature of the sample and thus provide a true temperature free of effects due to surface characteristics.

STATEMENT OF THE INVENTION

An object of the present invention is to provide a simple pyrometer for measuring true temperature by eliminating from the pyrometer measurement the effects due to surface characteristics of emissivity as well as diffusivity by inherent characteristics of instrument design rather than by external processing of brightness data separately determined.

This is accomplished by the unique design of a polaradiometer which is defined as an instrument for measurement of polarized radiation. It has been known that thermal radiation detected along a viewing axis that is not perpendicular to the surface of a hot body is partially polarized, just as radiation from a source emitting unpolarized radiation is partially polarized upon being reflected from the surface of that body. The essence of the present invention is the utilization of the principle that the effects of reflection and emission at an angle $\alpha < 90°$ on the polarization state are complementary, thereby eliminating the effects of emissivity and diffusivity at a null condition. Thus, by measuring the combined emitted and reflected radiation through a stationary polarization state analyzer (PSA) and radiation detector, the present invention provides a polaradiometric pyrometer that eliminates the need to separately measure emissivity or diffusivity. The essential elements are a PSA with radiation detectors positioned with a viewing axis at an angle $\alpha$ less than 90° to the surface of a hot body for detection of p and s polarized thermal radiation and a variable source of unpolarized radiation positioned to reflect its variable radiation from the surface of the hot body through the PSA into the radiation detectors Partially polarized radiation emitted by the hot body and received by the PSA combines with partially polarized radiation reflected through the PSA to the radiation detector such that, when the intensity of both are made equal by adjustment of the variable source, the radiation received by the PSA is unpolarized, and so the radiation passed through the PSA to the detector is nulled. The calibrated power driving the variable radiation source at the null condition is thus the true temperature of the hot body because the effects of emissivity as well as diffusivity of the hot body due to surface characteristics is eliminated in the combined unpolarized radiation at the null condition.

In a preferred embodiment, the PSA is implemented with a polarizing beamsplitter to provide from the intensity $I_1$ of emitted radiation entering the PSA from the hot body light polarized in two directions $I_{1p}$ and $I_{1s}$ and from the intensity $I_2$ of the reflected radiation entering the PSA from the hot body light polarized in two complementary directions. Thus, the polarization components of the partially polarized radiation intensities $I_1$ and $I_2$ can balance in such a way that the radiation received by the PSA is unpolarized for the null condition $I_{1p}+I_{2p}=I_{1s}+I_{2s}$, where the subscripts s and p refer to polarization components perpendicular and parallel to the plane of incidence of the reflected radiation. The true temperature of the hot body is thus determined by measuring the calibrated power driving the variable source of radiation.

To automatically reach a null condition, the combined polarized components $I_{1p}+I_{2p}$ and $I_{1s}+I_{2s}$ out of the PSA are separately detected to provide a signal $I_p - I_s$ is that integrated and used to control the power driving the variable source, which may be an incandescent lamp. That driving power is then calibrated to display the true temperature of the hot body.

DETAILED DESCRIPTION OF THE INVENTION

Figure 1:
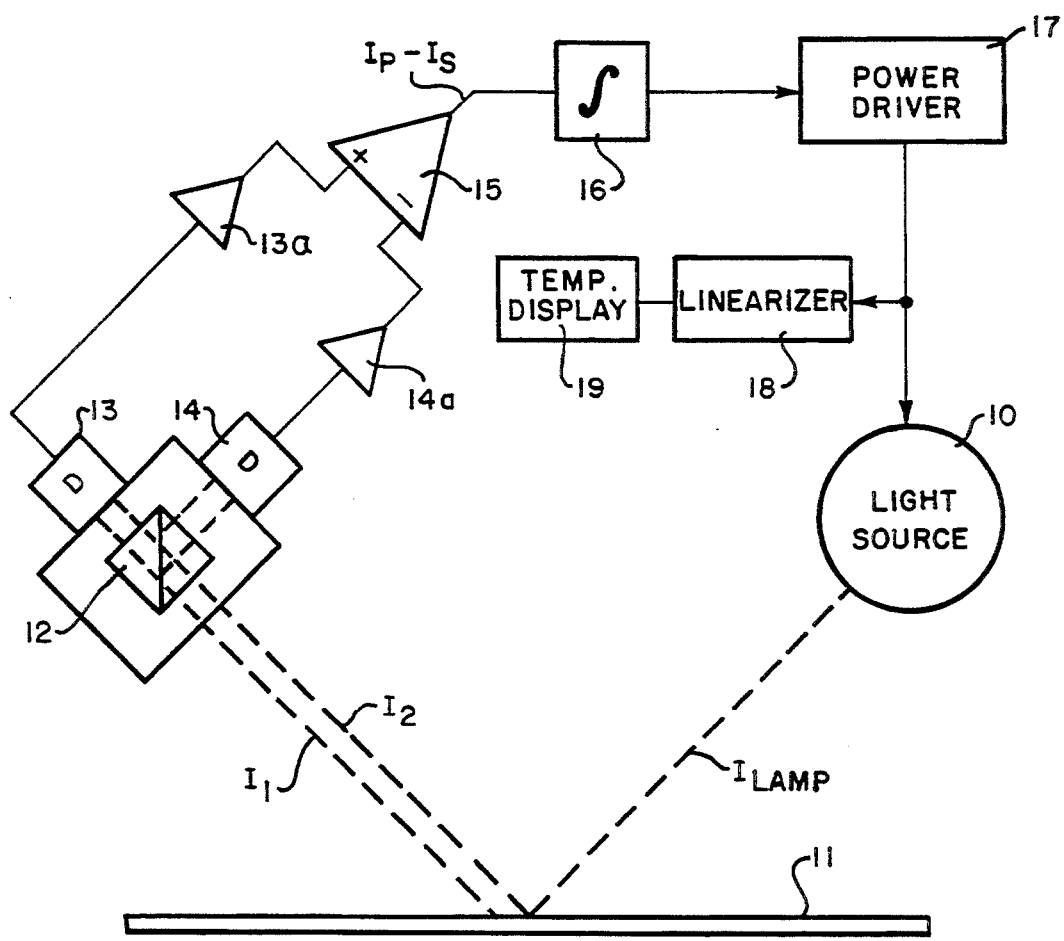
FIG. 1 illustrates diagrammatically essential elements of the present invention.

Referring to FIG. 1, the essential elements of the polaradiometer, a simple pyrometry device for measuring true temperature, comprises a variable source 10 of unpolarized light, such as an incandescent lamp positioned to reflect partially polarized radiation 12 from the surface 11 of a hot body at an angle $\alpha < 90°$ through a polarization state analyzer (PSA) 12 to detectors 13 and 14. Partially polarized thermal radiation $I_1$ emitted at the same angle and in the same plane as the incident radiation $I_2$ combines with the reflected radiation 12 to provide into the PSA combined polarization component signals:

$$I_p = I_{1p} + I_{2p}$$

$$I_s = I_{1s} + I_{2s}$$

When $I_{LAMP}$ is adjusted such that $I_p$ equals $I_s$, the combined radiation received by the PSA is unpolarized. The difference between the signals $I_p$ and $I_s$, from the detectors 13 and 14 is formed by an amplifier 15 and integrated by a circuit 16 designed to be a lossy integrator and used to control intensity $I_{LAMP}$ of the source 10 via a power driver 17, the output of which is processed through a linearizer 18 and calibrated for display in a temperature display unit 19. The effects of emissivity as well as diffusivity of the surface 11 are eliminated from the measurements by the inherent characteristics of the design rather than by any external post processing of brightness temperature data.

Other systems measure true temperature by determining the emissivity or emissivity ratio of the hot body and using the measured value to correct the reading from an otherwise standard pyrometer. That approach has two weaknesses. Systems are extremely complex since emissivity measurements involve cumbersome calculations, and the algorithms used to correct the pyrometer output for emissivity effects add post measurement computational requirements. The second drawback is that standard pyrometric measurements constitute a simple radiation intensity measurement. These can suffer from a lack of accuracy. The polaradiometer shown in FIG. 1 eliminates the need for any post calculations since no emissivity measurements or corrections are necessary. Since the polaradiometer uses a nulling approach rather than a simple intensity measurement it has the potential for greater accuracy.

This polaradiometer is based an the fact that the polarization of radiation emitted from a surface due to thermal emissions and the polarization of radiation reflected from the surface are complimentary. Thus when the polarization of a combination of emitted and reflected light is random the intensity of the reflected beam before reflection represents the brightness temperature of the surface.

As noted with reference to FIG. 1, the two main parts of the polaradiometer are a light source 10 emitting unpolarized radiation and a polarization state analyzer 12. The light from the source is reflected from the surface of the sample into the polarization state analyzer along with the thermal emissions from the sample. The optical axis of the analyzer must be at an angle $\alpha < 90°$ to the surface 11 of the sample, however, the value of that angle is not critical and can be varied without recalibration or changes to the polaradiometer. This greatly simplifies operation of the system since no cumbersome optical alignment is needed.

Due to the reflection at an angle, the radiation entering the PSA from the source is partially polarized. The emitted radiation received from the sample at the same angle is also partially polarized in the same way since it is emitted at the same angle. As noted hereinbefore, the essence of the function of the polaradiometer is to utilize the fact that the effect of reflection and emission at the same angle on the polarization state of radiation received at the PSA 12 are complementary and therefore eliminate the effects of emissivity in radiation from the sample surface If T is the thermodynamic temperature of the sample and $I_1$ the intensity of the radiation from the sample entering the PSA Planck's law states:

$$I_{1,\lambda} = \epsilon I_{b,\lambda} = \epsilon \frac{2hc_o^2}{\lambda^5 \left[ \exp\left(\frac{hc_o}{\lambda kT}\right) - 1 \right]}$$

where $\lambda$ is the wavelength of the radiation and $I_b$ is the corresponding black body radiation intensity. The function of the PSA is to decompose the polarization of the light into two mutually perpendicular directions:

$$I_{1p} = \frac{I_b \epsilon_p}{2}$$

and $$I_{1s} = \frac{I_b \epsilon_s}{2}$$

where the subscript p and s refer to polarization components parallel and perpendicular to the plane of emission.

Also for the radiation emanating from the source and being reflected to the PSA:

$$I_{2s} = \frac{I_{LAMP} \rho_s}{2}$$

and $$I_{2p} = \frac{I_{LAMP} \rho_p}{2}$$

where the subscript s and p refer to polarization components perpendicular and parallel to the plane of incidence and reflection which is common to the plane of emission. The Greek letters Epsilon and Rho ($\epsilon$ and $\rho$) stand for emissivity and reflectivity respectively. Both beams of radiation intensities $I_1$ and $I_2$ are partially polarized but when combined the polarization components can balance in such a way that the radiation received by the PSA is unpolarized. The condition for this is:

$$I_{1p} + I_{2p} 32 I_{1s} + I_{2s}$$

substituting and rearranging:

$$I_b \epsilon_p + I_{LAMP} \rho_p = I_b \epsilon_s + I_{LAMP} \rho_s$$
$$I_b(\epsilon_p - \epsilon_s) = I_{LAMP}(\rho_s - \rho_p)$$
since: $\rho_s = 1 - \epsilon_s; \rho_p = 1 - \epsilon_p$
$\rho_s - \rho_p = \epsilon_p - \epsilon_s$
$I_b = I_{LAMP}$ Using Planck's law, a relationship between $I_{LAMP}$ and T is expressed as follows:

$$I_{LAMP} = I_b = \frac{2hc_o^2}{\lambda^5 \left[ \exp\left(\frac{hc_o}{\lambda kT}\right) - 1 \right]}$$

This relation holds for any surface emissivity. The polaradiometer shown in FIG. 1 works by measuring or determining $I_{LAMP}$ such as by a measurement of the power driving the lamp or by providing a separate light detector offset from the axis of incidence for the light reflected to the PSA. In either case, the true temperature T of the sample can be found from that measurement of $I_{LAMP}$ quite easily:

$$T = \frac{hc_o}{\lambda k \ln \left[ \frac{2hc_o^2}{I_{LAMP} \lambda^5} + 1 \right]}$$

There is no need to determine the emissivity of the sample and correct measured brightness temperatures.

After the discovery of the basic principle of operation for this invention, a working model was made to demonstrate its feasibility at a wavelength of 1064 nm. This wavelength was chosen because it is the longest at which off-the-shelf optical components are available and because silicon detectors are sensitive to radiation at this wavelength. In general it is advantageous to choose longer wavelengths since thermal emissions from samples at all but extremely high temperatures are most intense at the longer wavelengths.

For the light source 10, a tungsten halogen lamp was chosen because it offers sufficiently intense radiation at the 1.064 nm wavelength. Low cost and ease of operation with a tungsten halogen lamp were additional considerations.

Figure 2:
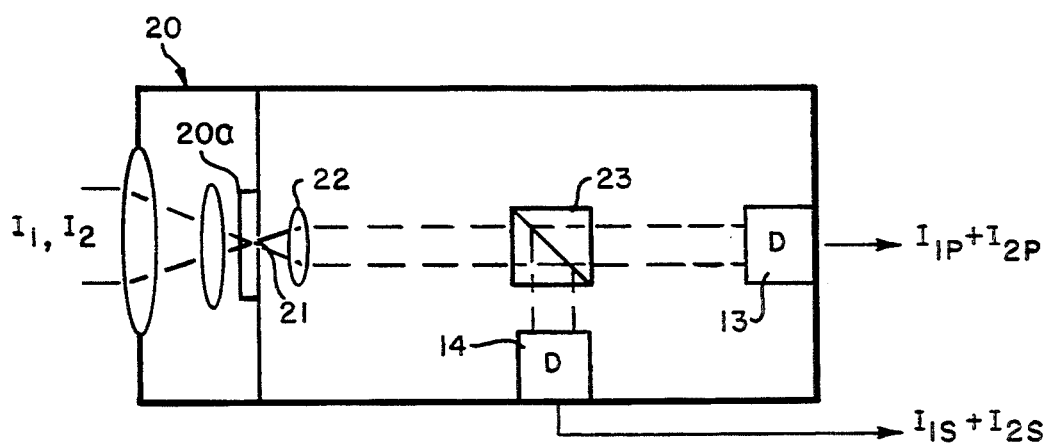
FIG. 2 is a schematic diagram of a conventional polarity state analyzer (PSA) shown in FIG. 1.

The PSA 12 was built as shown in FIG. 2 and provided with solid state detectors 13 and 14 as shown schematically in FIG. 1, but preferably housed within the enclosure for the PSA as shown in FIG. 2. The light entering the PSA is focused and filtered by a unit 20 through a pinhole 21 onto a collimating lens 22. An interference filter 20a is included in front of the pinhole for passing only 1064 nm light. The emerging light from the pinhole is collimated by the lens 22 and the resulting beam is polarized and split into two beams in a polarizing beamsplitter 23. The two polarization components, p and s impinge on detectors 13 and 14 implemented with silicon detectors. When the output signals from the two silicon detectors are equal, the two components of polarization are balanced, and so the output of the difference amplifier 15 is zero or nulled.

The output signals from the two detectors after appropriate amplification are compared to obtain the polarization state of the light. Since this polaradiometer does not require a measurement of the actual polarization state, the magnitude of the difference between the detector outputs is not important. The instrument merely has to achieve a state where the detector output signals are equal. When this state $I_{1p}+I_{2p}=I_{1s}+I_{2s}$ is reached, the light intensity $I_{LAMP}$ from the so represents the temperature measurement. As noted hereinbefore, the lamp intensity may be determined by measuring the driving power to the source which may be made by measuring the driving voltage and current from the power driver 17 or by the use of a separate detector for detecting light intensity directly from the source itself. Thus, the polaradiometer automatically adjusts the intensity of the lamp 10 until the outputs from the detectors 13 and 14 are equal. At that point the lamp intensity is converted to a temperature display in an analog or digital unit 23 as shown schematically in FIG. 1.

In summary, amplifiers 13a and 14a couple the detectors 13 and 14 to the amplifier 15. The output from the differential amplifier is connected to the integrator 16 which in turn controls the intensity of the source 10 via the power driver (transistor) 17. If the output of the amplifier 15 is nulled, the output of the integrator 16 and thus the intensity of the lamp remain constant. As soon as the polarization state just noted above is out of balance, the output of the integrator 16 will adjust the lamp intensity back to the condition where the polarization state is in balance. Since the intensity of the lamp is represented by the electrical current through it, the preferred means for measuring the lamp intensity $I_{LAMP}$ to simply sense the current amplitude since the voltage applied will in the usual implementation be constant. In any case, the value of this intensity measurement is processed through the linearizer 18 and then calibrated and displayed in analog or digital form in the display unit 19.

The amplifiers 13a and 14a are preferably implemented as high gain, low noise amplifiers with an adjustable zero position and gain. The zeroes and gains are then adjusted by supplying the PSA only a source of an unpolarized beam of light and ensuring that, with the light source turned off, both amplifiers read zero, and with the source turned on, the outputs of both amplifiers are exactly equal.

Figure 3:
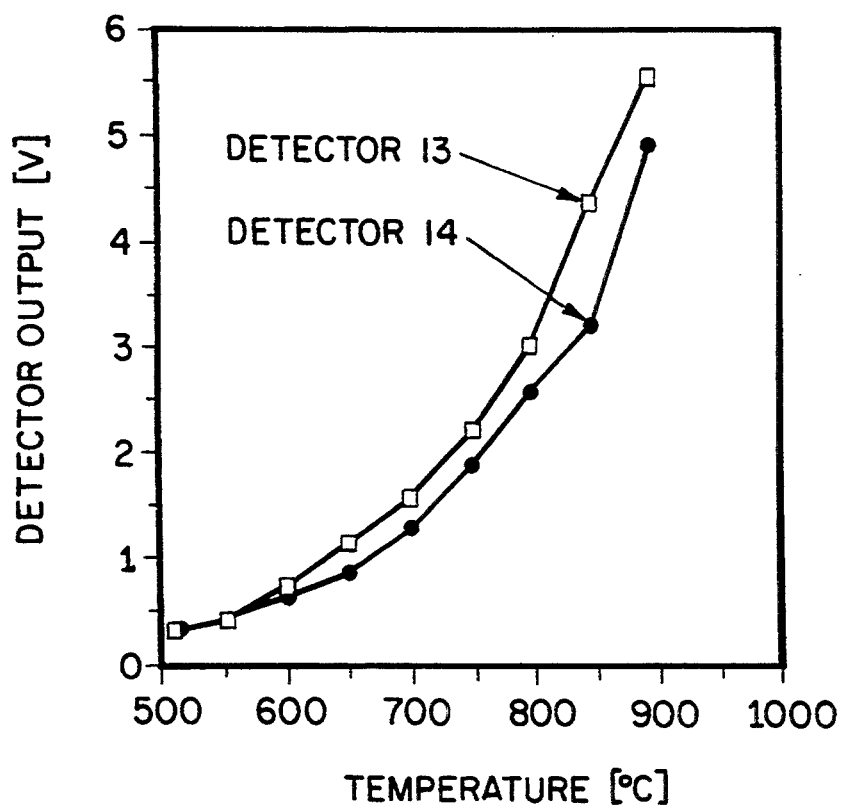
FIG. 3 is a graph of output voltages of detectors 13 and 14 in FIG. I as a function of temperature of a hot body.
Figure 4:
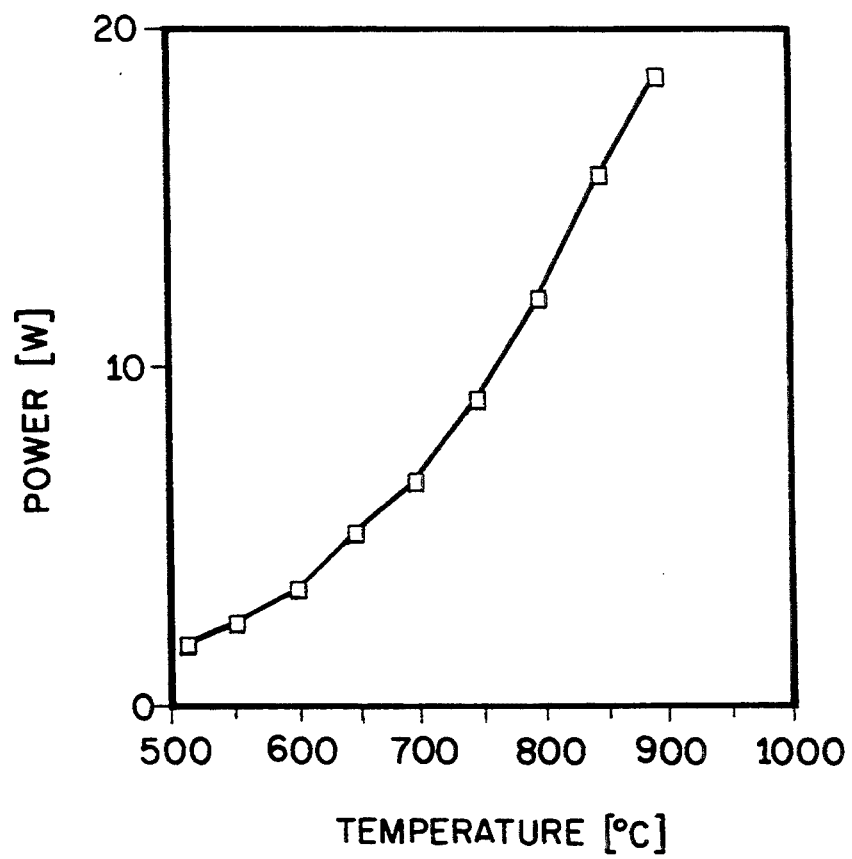
FIG. 4 is a graph of variable source power required to null polarization of incoming radiation as a function of temperature of a hot body.

For testing the model described with reference to FIG. 1, a heated platinum strip sample was installed such that the optical axis of the PSA was at 45° to the surface of the strip. FIG. 3 is a plot of the two output voltages versus sample temperature and FIG. 4 shows the source (tungsten halogen) input power W (voltage times current) needed to cause the two detector output voltages to be equal. This graph of power input to the source 10 versus temperature is thus the temperature measurement that is to be calibrated (linearized) for display. The data presented in FIGS. 3 and 4 were repeatable to within 5% with the prototype electronics used for the model but could be significantly improved in a final design of the electronics.

The invention thus has the potential of making accurate true temperature measurements without cumbersome computational requirements. The cost of a commercial polaradiometer built in accordance with this invention could therefore be far below that of any pyrometer available for true temperature measurements.

What is claimed is:

1. A method for measuring true temperature of a body based on the principle that the effect of reflection and angular emission on the polarization state of radiation are complementary at an arbitrary viewing angle less than 90° with respect to the surface of said body, thereby eliminating at a null condition the effects of emissivity and diffusivity due to surface characteristics, where said null condition is defined as a condition when the partially polarized intensity of said radiation energy reflected from said surface is made equal to the partially polarized radiation energy emitted by adjustment of intensity of incident radiation from an unpolarized variable source comprising the following steps:

positioning a polarization state analyzer to view reflected radiation from an unpolarized variable source incident on said surface of said body at a selected angle less than 90°, said polarization state analyzer having first and second detectors, said first and second radiation detectors being positioned to detect mutually perpendicular p and s components of both radiation reflected from said body at said selected angle and radiation emitted to provide combined polarization signals $$I_p = I_{1p} + I_{2p}$$

$$I_s = I_{1s} + I_{2s}$$

where $I_p$ is a detected sum of the analyzed intensity of polarization components of said radiation emitted and said radiation reflected $I_{1p}$ and $I_{2p}$, respectively, parallel to the plane of incidence of said radiation reflected, and $I_s$ is a selected sum of the analyzed intensity of polarization components of said radiation emitted and said radiation reflected $I_{1s}$ and $I_{2s}$, respectively, perpendicular to the plane of incidence of said radiation reflected, adjusting the intensity of radiation from said unpolarized variable source incident on said surface of said body until said null condition is satisfied where $I_p$ equals $I_s$, and determining the intensity of said unpolarized variable source at said null condition as a measurement of true temperature of said body.

2. Apparatus for measuring true temperature of a body based on the principle that the effect of reflection and angular emission on the polarization state of radiation are complementary at an arbitrary viewing angle less than 90° with respect to the surface of said body, thereby eliminating at a null condition the effects of emissivity and diffusivity due to surface characteristics, where said null condition is defined as a condition when the partially polarized intensity of said radiation energy reflected from said surface is made equal to the partially polarized radiation energy emitted by adjustment of intensity of incident radiation from an unpolarized variable source comprising:

a variable source of unpolarized radiation incident on said surface of said body, a polarization state analyzer positioned to view reflected radiation from said unpolarized variable source at a selected angle less than 90°, said polarization state analyzer having first and second detectors, said first and second radiation detectors being positioned to detect mutually perpendicular p and s components of both radiation reflected from said body at said selected angle and radiation emitted to provide combined polarization signals $$I_p = I_{1p} + I_{2p}$$

$$I_s = I_{1s} + I_{2s}$$

where $I_p$ is a detected sum of the analyzed intensity of polarization components of said radiation emitted and said radiation reflected $I_{1p}$ and $I_{2p}$, respectively, parallel to the plane of incidence of said radiation reflected, and $I_s$ is a selected sum of the analyzed intensity of polarization components of said radiation emitted and said radiation reflected $I_{1s}$ and $I_{2s}$, respectively, perpendicular to the plane of incidence of said radiation reflected, means for adjusting the intensity of radiation from said unpolarized variable source incident on said surface of said body until said null condition is satisfied where $I_p$ equals $I_s$, and means for determining the intensity of said unpolarized variable source at said null condition as a measurement of true temperature of said body.

3. Apparatus as defined in claim 2 wherein said means for adjusting the intensity of radiation from said unpolarized variable source incident on said surface of said body until said null condition is satisfied comprises means for detecting and amplifying a signal proportional to the difference between said analyzed intensities of polarization components $I_p$ and $I_s$, means for regulating the intensity of said variable source of unpolarized radiation incident on said surface of said body until said difference is reduced to zero, and means for measuring the intensity of unpolarized radiation emitted by said variable source.

4. Apparatus as defined in claim 3 wherein said means for regulating the intensity of said variable source of unpolarized radiation comprises means for deriving a control signal from said amplified difference and a power driver regulated by said control signal derived from said amplified difference to produce a power signal that drives said variable source to reach said null condition.

5. Apparatus as defined in claim 4 wherein said means for deriving said control signal comprises a lossy integrator for accumulating a running average of said difference, thereby producing a control signal that stabilizes when said null condition is reached.

6. Apparatus as defined in claim 5 further comprising means for sensing said power signal, and means responsive to means for sensing said power signal for displaying calibrated temperature corresponding to said true temperature of said body.

* * * * *